United States Patent
Crawford, Jr.

(10) Patent No.: US 10,315,528 B1
(45) Date of Patent: Jun. 11, 2019

(54) UNMANNED VEHICLE AND BASE STATION

(71) Applicant: Owen Crawford, Jr., Dallas, TX (US)

(72) Inventor: Owen Crawford, Jr., Dallas, TX (US)

(*) Notice: Subject to any disclaimer, the term of this patent is extended or adjusted under 35 U.S.C. 154(b) by 0 days.

(21) Appl. No.: 15/435,258

(22) Filed: Feb. 16, 2017

Related U.S. Application Data

(60) Provisional application No. 62/295,537, filed on Feb. 16, 2016.

(51) Int. Cl.
  *B64C 39/02* (2006.01)
  *B60L 11/18* (2006.01)

(52) U.S. Cl.
  CPC ....... *B60L 11/1824* (2013.01); *B60L 11/1816* (2013.01); *B60L 11/1822* (2013.01); *B64C 39/024* (2013.01); *B64C 2201/042* (2013.01)

(58) Field of Classification Search
  USPC ............................................................ 701/2
  See application file for complete search history.

(56) References Cited

U.S. PATENT DOCUMENTS

| | | | |
|---|---|---|---|
| 8,511,606 B1 | 8/2013 | Lutke et al. | |
| 8,862,288 B2 | 10/2014 | Vavrina et al. | |
| 8,899,903 B1 * | 12/2014 | Saad | B65G 67/00 |
| | | | 414/392 |
| 8,989,922 B2 | 3/2015 | Jones et al. | |
| 9,158,304 B2 | 10/2015 | Fleck | |
| 9,280,038 B1 * | 3/2016 | Pan | G03B 17/561 |
| 9,623,760 B2 * | 4/2017 | Wang | B60L 11/1822 |
| 9,781,312 B2 * | 10/2017 | Pan | H04N 5/2251 |
| 2006/0249622 A1 | 11/2006 | Steele | |
| 2010/0147993 A1 * | 6/2010 | Annati | B64C 27/20 |
| | | | 244/12.2 |
| 2011/0084162 A1 | 4/2011 | Goossen | |
| 2012/0153087 A1 | 6/2012 | Collette et al. | |
| 2012/0226394 A1 | 9/2012 | Marcus | |
| 2013/0081245 A1 * | 4/2013 | Vavrina | B60L 11/1822 |
| | | | 29/402.08 |
| 2013/0134254 A1 | 5/2013 | Moore | |
| 2014/0303814 A1 | 10/2014 | Burema | |
| 2015/0063959 A1 | 3/2015 | Saad et al. | |
| 2015/0120094 A1 | 4/2015 | Kimchi et al. | |
| 2016/0039541 A1 * | 2/2016 | Beardsley | B60L 11/1816 |
| | | | 701/2 |
| 2016/0144734 A1 * | 5/2016 | Wang | B60L 11/1822 |
| | | | 701/17 |
| 2016/0376031 A1 * | 12/2016 | Michalski | B64F 1/36 |
| | | | 701/15 |

FOREIGN PATENT DOCUMENTS

| | | |
|---|---|---|
| EP | 2188176 B1 | 3/2011 |
| WO | 2014080385 A2 | 5/2014 |

* cited by examiner

*Primary Examiner* — Tyler D Paige

(57) ABSTRACT

An unmanned vehicle and base station are disclosed that provide an efficient, automated, and quick system for loading onto and un-loading from the unmanned vehicle modular attachments or cartridges. The UAV can also include numerous components, modules, functionalities, and built-in features, including an emergency operation mode, payload delivery mode, and dispensing mode, among other advantages.

19 Claims, 11 Drawing Sheets

UNMANNED VEHICLE AND BASE STATION

CROSS REFERENCE TO RELATED APPLICATIONS

This application claims the benefit of U.S. Provisional Application No. 62/295,537 filed on Feb. 16, 2016, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

An unmanned vehicles, unmanned aerial vehicles (UAV), or drones are aircraft or vehicles that fly or travel without human operators being present in the aircraft. UAVs may be controlled from a remote location from a remote controller. At this remote location, a human operator or a program executed by a computer generates commands for the UAV. UAVs may also be controlled using a program running on a computer or other controller on the UAV.

The use of UAVs to conduct surveillance or fly other payload missions in remote and/or hostile environments or under dangerous conditions has significant benefits. The most obviously of these benefits is the avoidance of human exposure to these environments. Other benefits derive from the ability to equip a UAV with data collection instruments and sensors that provide the capability to collect a large quantity of data over a large data collection area or physically dangerous data without human intervention.

Further, there are certain situations that call for critical devices and/or deliveries to be transported to a scene of the situation where there is a need of aid. In such situations, there is typically an urgency regarding the transportation of the devices and/or deliveries. Such devices and/or deliveries may be located on an unmanned vehicle.

However, few solutions exists for a simple, efficient, and automated system that includes a UAV (or any unmanned vehicle) to be deployed quickly and be loaded with payload to be carried for either an emergency situation, surveillance, or delivery of certain objects or cargo.

Hence, what is needed a UAV and base station method, system, and apparatus that allows for a UAV to be efficiently loaded with payload, objects, or cargo to be delivered to a site location either for emergency situations, surveillance, or payload delivery.

BRIEF SUMMARY

In one aspect of the present disclosure described herein, a UAV and base station are disclosed that provide an efficient, automated, and quick method of loading onto and un-loading from a UAV various modular cartridges, attachments, or objects. The UAV can also include numerous built-in or integrated components, parts, features, and functionalities, including an emergency operation mode, payload delivery mode, and dispensing mode, among other functionalities and advantages.

In one or more further aspects of the present disclosure described herein, a UAV system is disclosed that can monitor, assist and defend anything from anywhere in the world using any computing device, mobile phone, or gaming console, among others. The UAV can further include an aerodynamic shape, camera, motion sensors, siren, and other modular features. The UAV can also be set up to be monitored by a monitoring company to ensure the safety of a dwelling, residential home, warehouse, retail or commercial office, among others. Further, the UAV can be communicated with using cellular, Wi-Fi, Bluetooth, or any other wireless technology. The UAV can also be powered by a rechargeable battery pack, or any other renewable energy, including but not limited to solar or wind. The UAV may also be programmed to return to its home base station to charge, change batteries, or change out one or more cartridges or pods. The UAV includes interchangeable cartridge slots that allow a user to install/load specialized cartridges based on particular situations. In addition, a user has the ability to change cartridges, battery, or payloads out manually as well; however in the event that a user is unable to, an auto mode features allows the UAV system to replenish itself when necessary.

Further, the UAV can communicate with approved devices, such as other UAVs, its related wheeled ground vehicles (GDU), special smoke detectors, and special carbon monoxide detectors, among others. In addition, a miniature UAV version can also be provided that can sweep through areas to perform quick reconnaissance operations. If one or more large UAVs are needed to resolve a situation, the miniature UAV can request help. In the event that one UAV that is not capable of solving a particular issue or situation, then additional nearby UAVs can be requested for assistance. Here, the requested UAVs can be required to have pre-approval to work with other UAVs. In addition, the UAV system can also be able to assist emergency personnel.

In another aspect of the disclosure described herein, an unmanned vehicle and base station is disclosed having an unmanned vehicle configured to be controlled remotely, a first compartment within the unmanned vehicle for carrying payload, wherein the payload includes one or more cartridges. In addition, the apparatus or system can include a base station having a second compartment for housing the cartridges, and a retrieving mechanism secured to the base station, wherein the retrieving mechanism is configured to retrieve the cartridges from the second compartment of the base station. The apparatus or system can further include wherein the retrieving mechanism is comprised of graspers or jaws. In addition, wherein the second compartment can be a round tray. Further, the tray can be configured to rotate in a circular orientation. Further, the unmanned vehicle can be supported on a platform above the tray. In addition, the tray can have a plurality of third compartments, wherein each of the third compartments can be configured to house the cartridges. Here, the base station can also include a battery drop chute configured to receive used batteries from the unmanned vehicle. Further, the cartridges can be comprised of: cameras, batteries, supplies, sensors, chemicals, or lighting. In addition, the base station can include a charging dock. The unmanned vehicle can also include a power regeneration component. Here, the power regeneration component can have a first motor and a second boosting or electrical generator motor. Further, the first motor can be configured to receive power from a battery, and the second motor can be configured to receive rotational power from the first motor via a mechanical engagement.

The unmanned vehicle and base station can also include wherein the first motor includes a first shaft and the second boosting motor includes a second shaft, and wherein the first shaft engages the second shaft. Further, the second shaft can include a plurality of gears for capturing the rotational mechanical energy and converting it to electrical energy. Here, the electrical energy can be directed back to the battery, an auxiliary battery, the first motor, or other electrical components of the unmanned vehicle.

In another aspect of the disclosure described herein, an unmanned vehicle and base station is disclosed that includes an unmanned vehicle configured to be controlled remotely or at least partially autonomously. The apparatus or system can include a first compartment within the unmanned vehicle, a base station comprising a second compartments for housing the modular components, and a retrieving and loading mechanism secured to the base station, wherein the retrieving mechanism is configured to retrieve the cartridges from the second compartment of the base station and load them into the first compartment of the unmanned vehicle.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Phrases and terms similar to "software", "application", and "firmware" may include any non-transitory computer readable medium storing thereon a program or algorithm, which when executed by a computer, causes the computer to perform a method, process, or function.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Figure 1A:
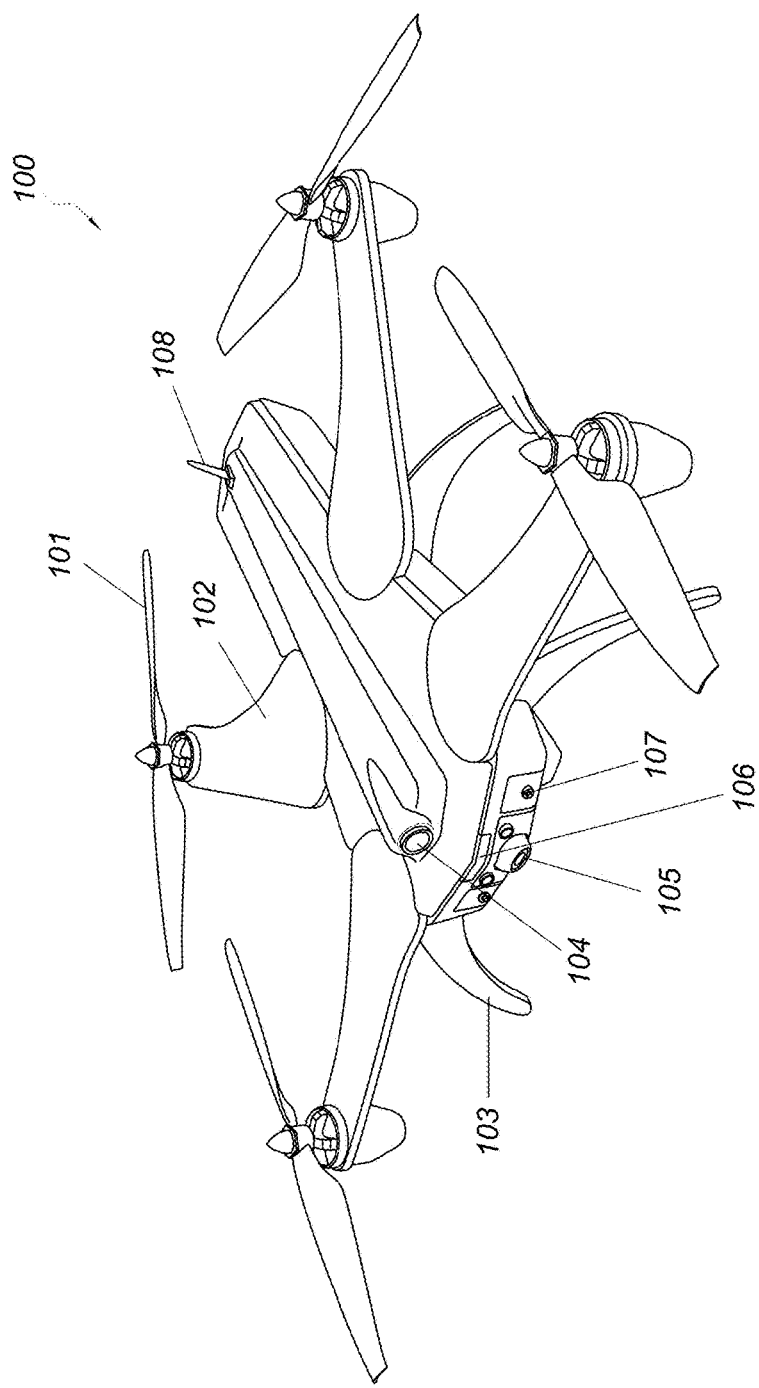
FIG. 1A illustrates a perspective view for one non-limiting embodiment of an unmanned aerial vehicle (UAV) of the present disclosure described herein.
Figure 1B:
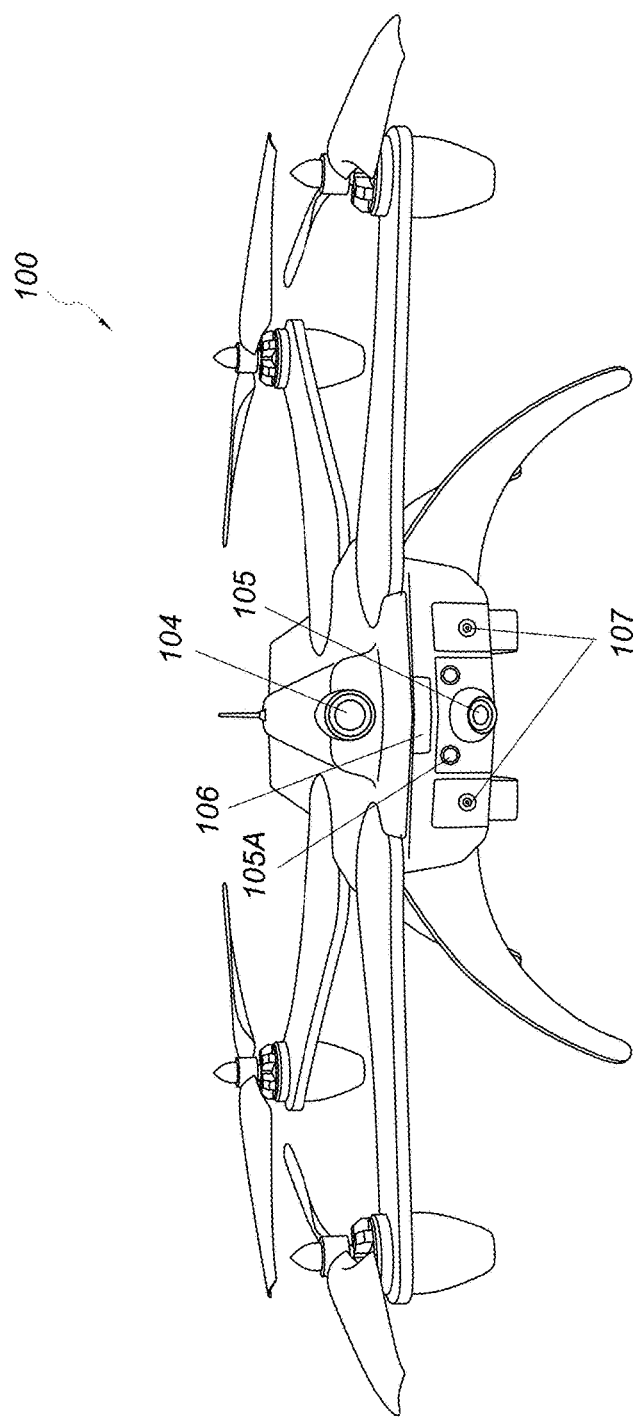
FIG. 1B illustrates a front view for the embodiment of FIG. 1A.

Referring now to FIG. 1A-1B, an unmanned vehicle (UV) or unmanned aerial vehicle (UAV) is shown according to one non-limiting embodiment. Here, UAV 100 includes at least four rotary blade motors and propellers 101, antenna 108, replaceable or modular wings or arms 102, replaceable or modular legs 103, an overhead built-in video camera or image capturing device 104, a modular or removable camera payload cartridge 105 (and corresponding microphone or speakers 105A) and corresponding compartment/slot for receiving it therein, a modular or removable position sensor 106 (which may also be a battery) and corresponding compartment/slot for receiving it therein, and removable and modular dual modular liquid spraying nozzles cartridges 107 and corresponding compartment/slot for receiving it. Here, the UV 100 may be remote controlled by an operator, pre-programmed, or automated to fly, travel, or operate according to pre-defined instructions or software. Further, it is contemplated within the scope of the disclosure herein that UV 100 may also include any other type of modular payload cartridges and be of any shape, size, or configuration.

Figure 2A:
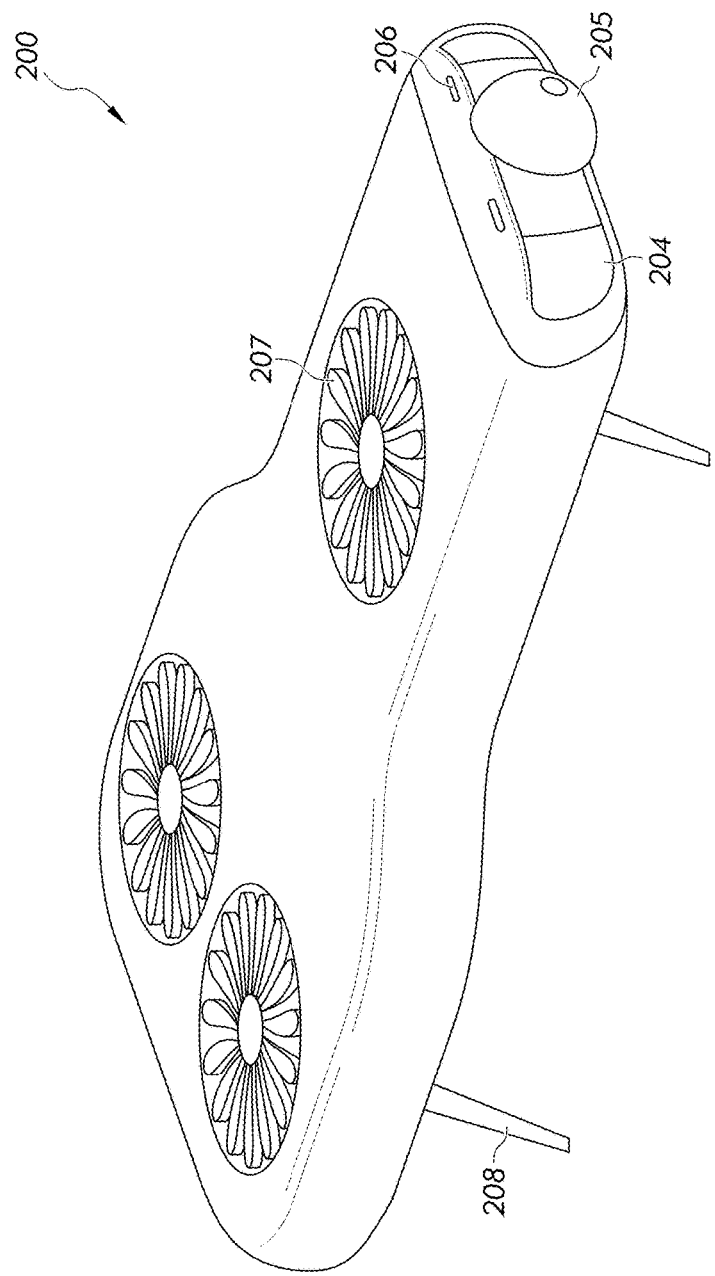
FIG. 2A illustrates a perspective view for another non-limiting embodiment of a UAV of the present disclosure described herein.
Figure 2B:
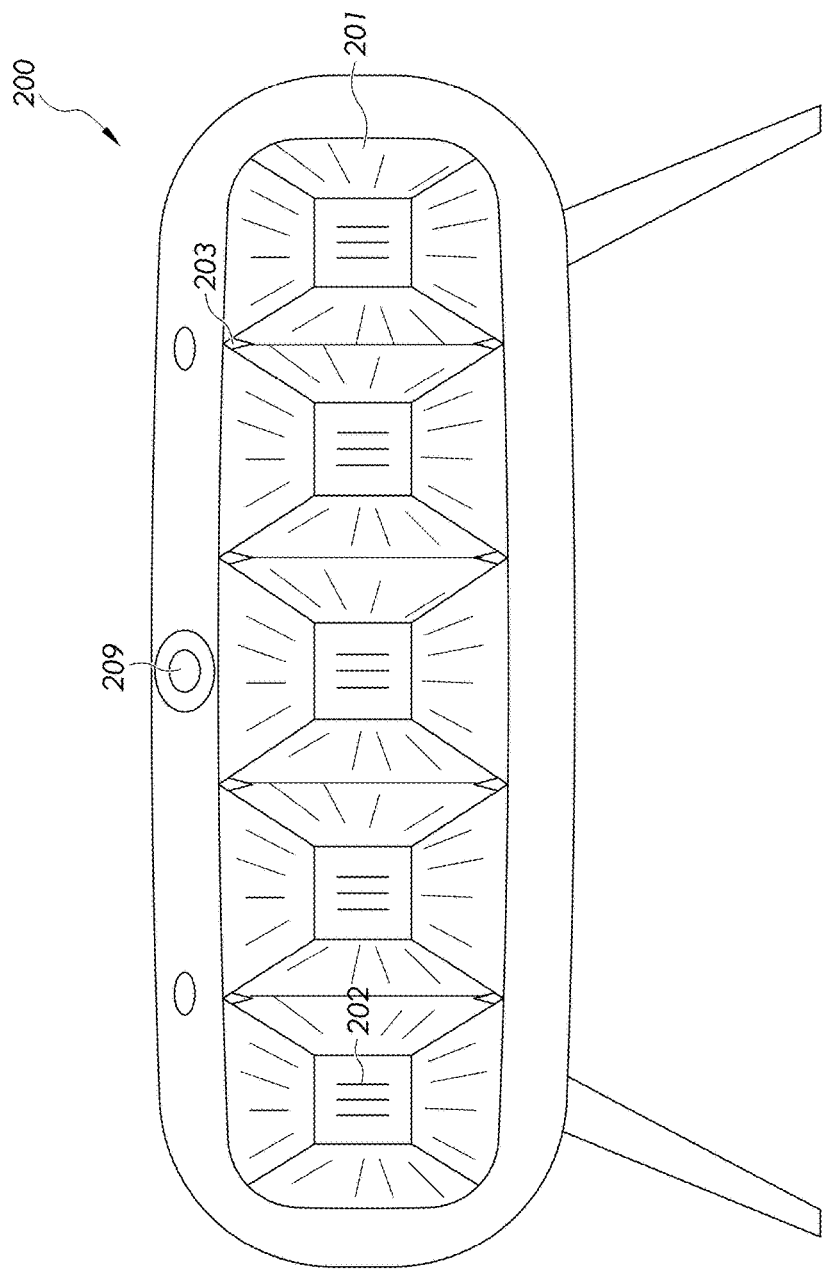
FIG. 2B illustrates a front view for the embodiment of FIG. 2A.

Referring now to FIG. 2A-2B, another non-limiting embodiment is shown for an unmanned vehicle or UAV 200 (or UAV 100, 400, 450), wherein FIG. 2B illustrates a front region of the UAV with a slot cover removed illustrating the interior compartments or slots for receiving the cartridges. Specifically, UAV 200 (or UAV 100, 400, 450) can include cartridge slots/compartments 201, cartridge slot contacts or receivers 202 towards at the end of the compartment which may include electrical contacts or communication interface (such as for receiving a battery cartridge for charging or transmitting data), cartridge slot guide 203 to assist with proper alignment of the cartridges, cartridge slot cover 204, removable camera or video capture device 205 cartridge, sensors 206 for motion detection, crash prevention, and distance detection, built-in propellers 207, landing or take-off legs or supports 208 which may also include wheels or flotation devices, and a fixed camera or video capture device 209.

Still referring to FIG. 2A-2B, one or more cartridges or attachments can be coupled to, installed, or loaded onto the UAV and then subsequently ejected, decoupled, unloaded, or released from the UAV with a tool, robotic claw or graspers, ejection, or catch mechanism, or the like. Further, it is contemplated within the scope of the disclosure that the docking or base station is not always required for installations of cartridges. Further, based on the type of UAV desired, the size, shape, or dimensions may vary in addition to the number of cartridge slots. For example, the UAV may have anywhere from 1-100 different cartridge slots, wherein the cartridge slots may also be configured anywhere on the UAV such as the top, bottom, front, back, or sides of the UAV. It is further contemplated within the scope of the disclosure that the UAV may also include a front portion or head (such as the camera) that can be independently manipulated with respect to the rest of the UAV body portion, such as having pan/tilt or 360 degree rotation for image or video capture, or functionality for other attachments or cartridges which may be installed on the head or front end. Additionally, the fixed or non-fixed position of this head is not limited to the front of UV, UAV, MV, MAV, etc.

Figure 3A:
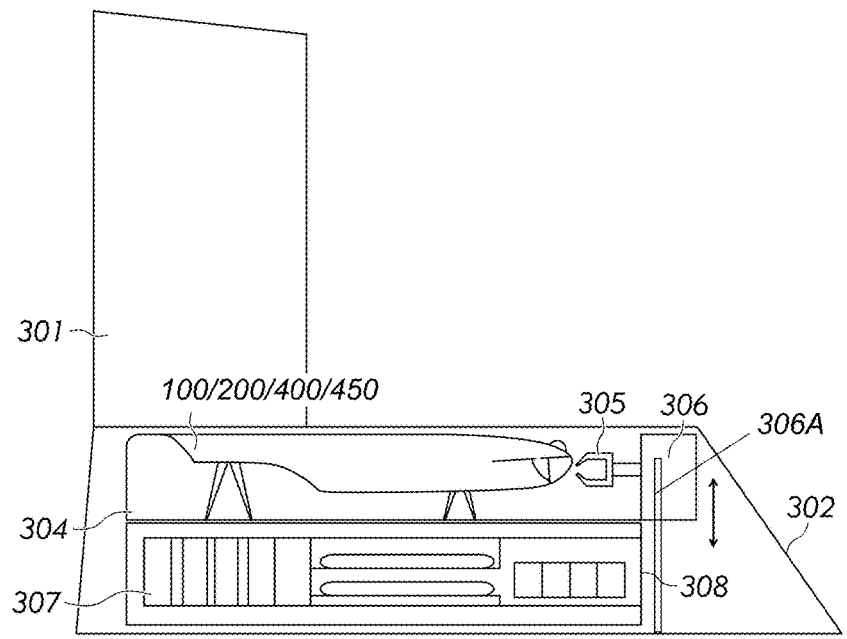
FIG. 3A illustrates a partial cross-sectional side view for one non-limiting embodiment of a base station housing for the UAV of the present disclosure described herein.
Figure 3B:
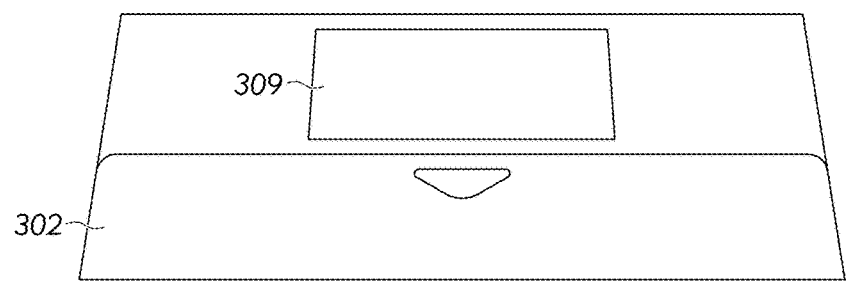
FIG. 3B illustrates a front view for the embodiment of FIG. 3A.

Referring now to FIG. 3A-3B, an embodiment is shown for a base or docking station for the UAV of the disclosure described herein. It is contemplated that the base station and cartridges disclosed herein may also be integrated with and used with other unmanned vehicles, such as unmanned ground vehicles or other types of unmanned vehicles disclosed herein. Specifically, either of UAV 100, 200, 400, or 450 is shown within a main base station that can include an entry point or door 301 that may be opened or closed automatically or manually, which may also be a reciprocating, revolving, sliding, or hinged door. Here, UAV 100, 200, 400, or 450 is shown supported on a platform, which may further include an opening or tray (not shown) that allows for a battery to be dropped through to the battery shoot opening 329. Further, a replenish tray 302 is also provided that can house or store the cartridges or attachments. In addition, a rotating table 304 is also provided which can rotate the UAV into a proper position and angle for installation/loading/unloading of the attachments and cartridges. Further, a retrieval claw, loading, unloading mechanism, or grasper 305 is shown that assists in installing, loading, unloading the cartridges and attachments. For example, retrieval claw 305 may have any capability for performing such loading/unloading tasks, including but not limited to release/catch/engage/dis-engage mechanism, or magnetic engage/dis-engage mechanism. In addition, the base station may also provide capability for installing additional graspers 305. It is contemplated within the scope of the disclosure that any other attaching, coupling, loading, and unloading means may also be incorporated in addition to or in lieu of grasper 305. In particular, grasper 305 can be further secured to a motorized elevating, lifting, and lowering mechanism 306, wherein the mechanism 306 can move vertically up and down via a shaft 306A to retrieve one or more cartridges from the rotary tray to be loaded into a compartment or cartridge slot of the UAV via graspers 305. Further, other embodiments can have retrieving mechanisms or graspers that move horizontally or in any direction.

Still referring to FIG. 3A-3B, the base station includes a plurality of attachments or cartridges 307. As disclosed within this disclosure, cartridges 307 may be of any type, size, or configuration. Here, the base station may also include a bottom rotating table 308 for holding cartridges and rotating them until a proper cartridge is directly below or aligned with grasper 305 for proper engagement with the grasper. In addition, the base station may also include buttons or a touch screen graphical user interface 309 for operating or programming the base station and/or UAV. In addition, it is contemplated within the scope of the disclosure that the base station may also include various hold-down or securing mechanism, such as brackets, clamps, magnets, or molding to secure the UAV during cartridge installing/loading/unloading operations, or maintenance operations.

Figure 3C:
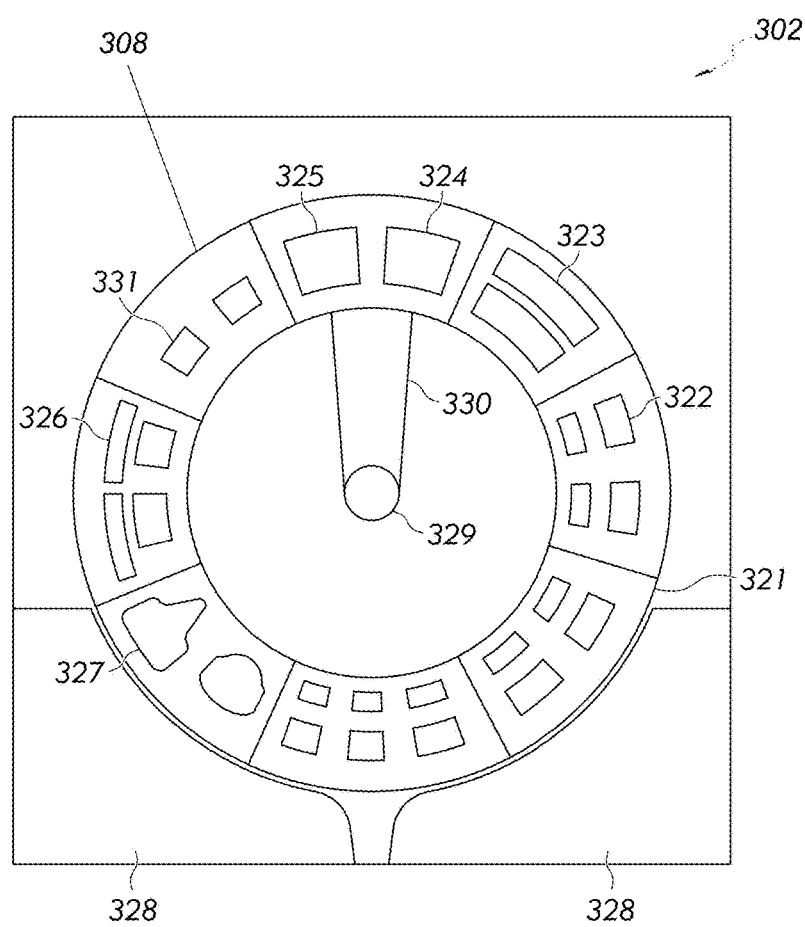
FIG. 3C illustrates a top view for the embodiment of FIG. 3A.

Referring to FIG. 3C, a top view for the replenish tray 302 is shown. Here, the tray includes a round rotating table 321 that allows for the storage of all replacement cartridges and attachments. In addition, the tray will rotate to a position based on a requested or desired cartridge below the retrieval grasper 305. In addition, rotating table 321 can also include one or more item scanners at the bottom of the tray (or to other areas) to keep track of inventory. In addition, a standard size cartridge 322 is shown which in one embodiment may require one slot on the UAV for attachment. The replenish tray may also include a larger sized cartridge 323 requiring more power and which may also require two or more slots on the UAV for attachment.

The replenish tray may also include a first battery charging dock 324 and a second battery charging dock 325 for charging/re-charging the UAV's batteries and/or power reserve. The replenish tray may also include various advanced attachments 326 that serve various functionalities independent of cartridges 322 or 323. Other miscellaneous cartridges such as cartridge 331 may also be included with the replenish tray. The base station may also include an advanced camera cartridge 327 that can include a camera or video capture system that is much larger than the standard equipped with the UAV, wherein the advanced camera cartridge 327 may include capabilities such as laser or night vision. The replenish tray may also include dual trash bins 328 for the base station/replenish tray to dispose of used cartridges or batteries. The base station may also include a battery drop chute 330 having a retrieval belt, slide, other retrieval means for receiving dropped batters from the UAV through opening 329. It is contemplated within the scope of the disclosure that the charging docks 324 and 325 may also be positioned or stacked on top of each other rather than side by side; such a configuration would help prevent the battery drop chute 330 from having to swivel left and right in addition to up and down for a four battery charging dock.

Figure 4A:
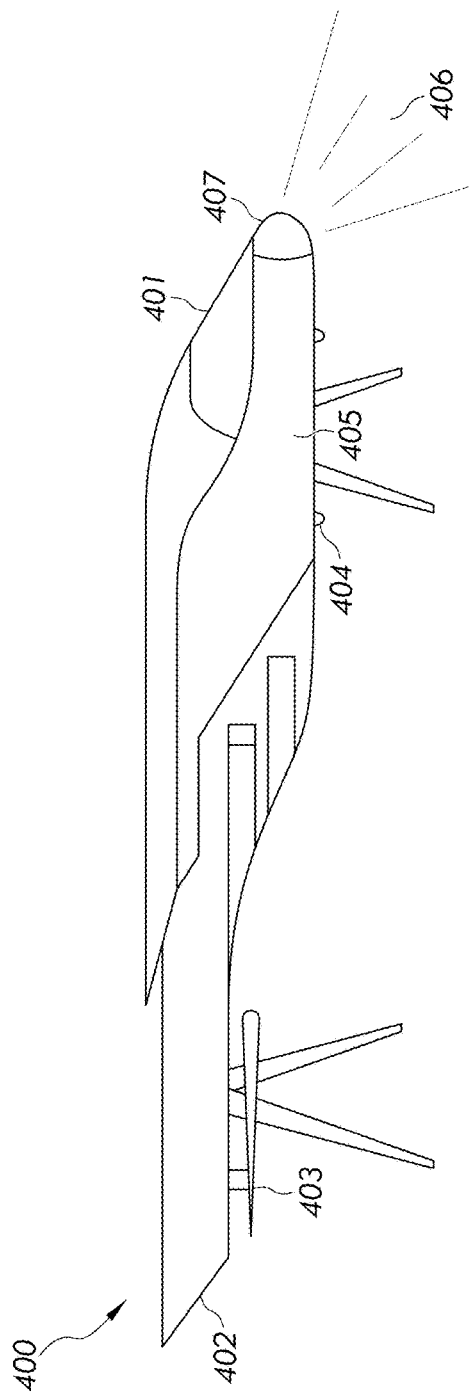
FIG. 4A illustrates a side view for another non-limiting embodiment of a UAV for emergency operations of the present disclosure described herein.
Figure 4B:
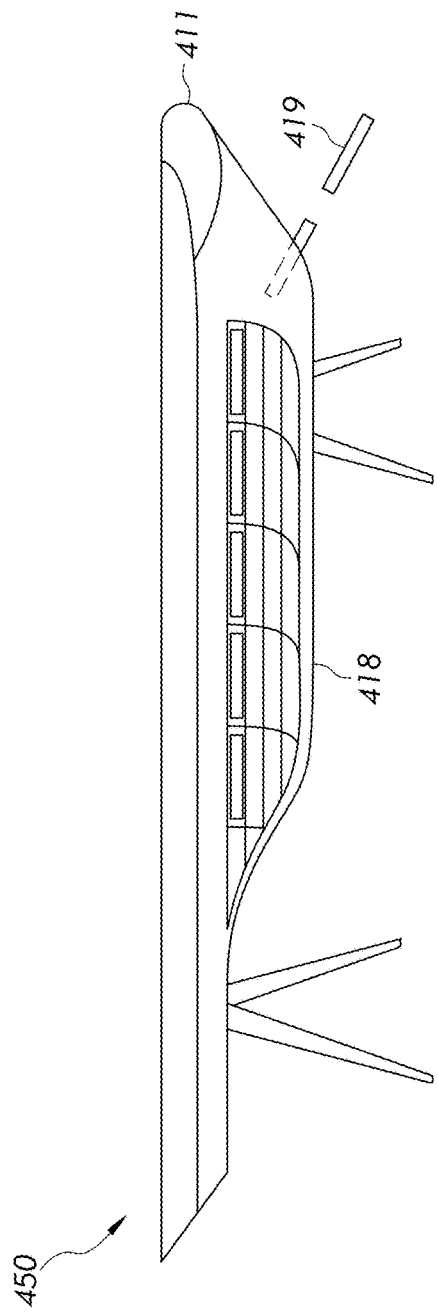
FIG. 4B illustrates a side view for another non-limiting embodiment of a UAV for dispensing operations of the present disclosure described herein.
Figure 5C:
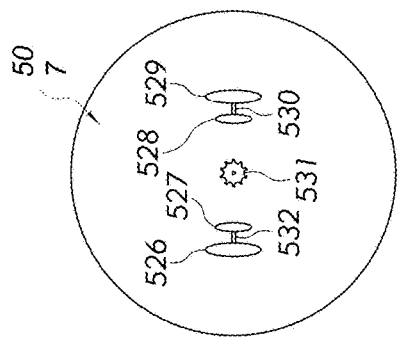
FIG. 5C illustrates a top view of the second generator/booster/energizer/regenerative motor.
Figure 5B:
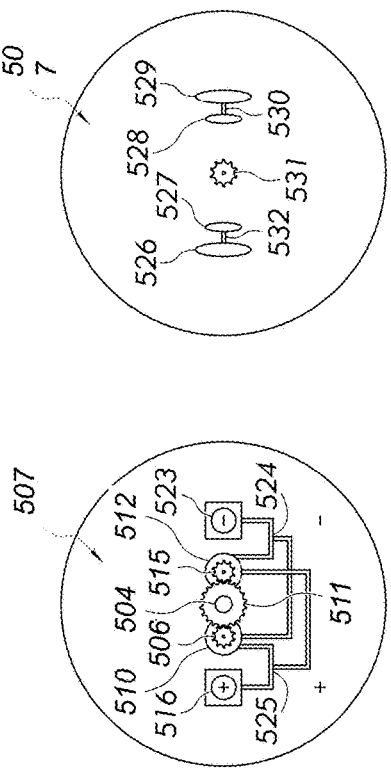
FIG. 5B illustrates a partial cross-sectional top view of the second generator/booster/energizer/regenerative motor.
Figure 5D:
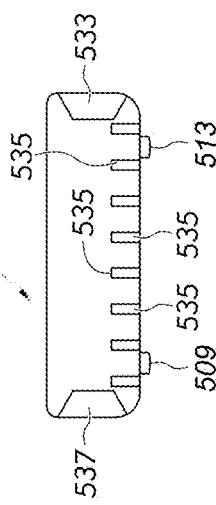
FIG. 5D illustrates a partial side view of the second regenerative motor.
Figure 5A:
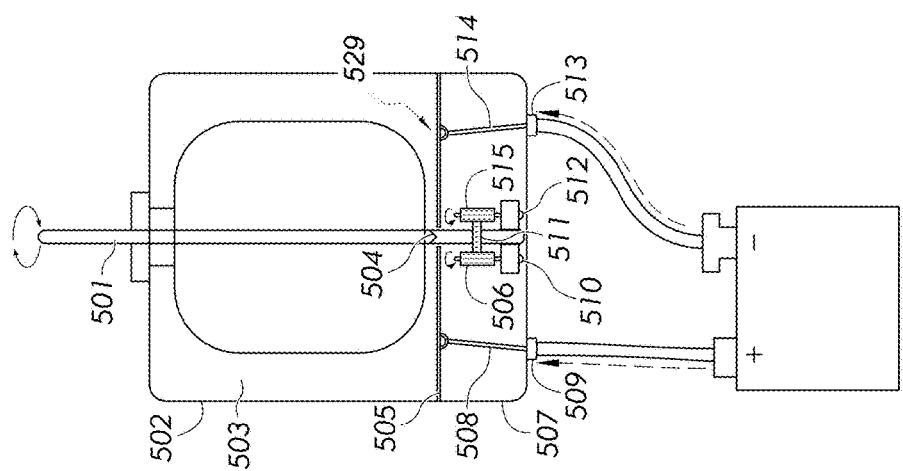
FIG. 5A illustrates a partial cross-sectional side view for one non-limiting embodiment of a power regeneration system of the disclosure described herein, wherein the motor power regeneration system includes a first main motor, a second generator/booster/energizer/regenerative motor, and a battery.

Referring now to FIG. 4A, one embodiment is shown for a UAV configured for emergency situations. FIG. 4B illustrates another embodiment of a UAV configured for dispensing operations. For the emergency model, the UAV can include a camera 401, storage bin or compartment 402, an "EpiPen", Antidote, disinfectant, active ingredients, or chemicals 403. In addition, the UAV may also include a front syringe holder 404 for securing various syringes for possible intravenous injection. In addition, the UAV can include a reservoir tank 405 for storing fire/extinguishing chemicals/retardants and dispensing or releasing them as needed. In addition, one or more spray nozzles 406 may also be provided on the UAV and integrated pump systems for pumping fluids from the reservoir tank and out the nozzles. In addition, one or more swivel or articulating nozzle heads 407 may also be included in the UAV. Referring now to the dispenser configured UAV, The UAV can also include a camera or video capture device 411. In addition, this UAV can include storage container 418 and one or more dispensable items 419, such as food, snacks, dog/cat treats, fish food, or any other object or item needed for dispensing. Such items 419 may be stored in and retrieved from storage container 418.

Referring now to FIG. 5A-5D and FIG. 6, a power and motor booster is shown that can provide renewable energy or regenerative power to the UAV in a closed loop cycle. In particular, the power and motor booster of the disclosure is generally intended to either provide complete or partial power regeneration and/or increase of battery life. More specifically, referring to FIG. 5A-5D and FIG. 6, the power boosting system includes but is not limited to the following components:

501—Main motor rod
502—Main motor outer shell
503—Main motor inner components
504—Bottom area of main motor rod that engages and interlocks with the top of the second generator/regenerator/booster/energizer motor rod
505—Bottom area of main motor and the top of the energizer meet/lock
506—Second regenerator motor gear
507—Second regenerator/booster/energizer outer shell
508—(+) wire connecting second booster motor to main motor contact
509—Second regenerator/booster bottom (+) contact point
510—Second regenerator/booster motor shaft
511—Second regenerator/booster gear and shaft
512—Second regenerator/booster gear
513—Second regenerator/booster (−) contact point
514—(−) wire connecting booster/regenerator motor to main motor contact
515—Second regenerator/booster motor gear
516—(+) power coming from battery
523—(−) power coming from battery
524—(−) power coming from battery and second regenerator/booster motor
525—(+) power coming from battery and second regenerator/booster motor
526—Booster (+) contact that connects with main (+) contact on the main motor
527—(+) contact for power generated from second regenerator/booster motor
528—(−) contact for power generated from second regenerator/booster motor
529—Booster (−) contact that connects with main (−) contact on the main motor
530—Wire linking (−) powers together
531—Second regenerator/booster motor's shaft that connects to motor shaft 501 at 504
532—Wire linking (+) powers together
533—Press-in button to unlock and detach from main motor
535—Air vents
537—Press-in button to unlock and detach from main motor
601—Shaft
602—Battery
603—Positive energy
604—Negative energy
605—Positive wire
606—Negative wire
607—Generator 1
608—Generator 2
609—Generator 1 spinning gear
610—Generator 2 spinning gear
611—Main motor spinning gear Still referring to FIG. 5A-5D and FIG. 6, it is noted that components 527, 528, 530, and 532 may also be located within the booster. In addition, it is contemplated within the scope of the disclosure that other electronic components can be included that allow both booster motors to send power/energy that they generates through the wiring and may restrict it from receiving energy/power from the battery and main motor.

Figure 6:
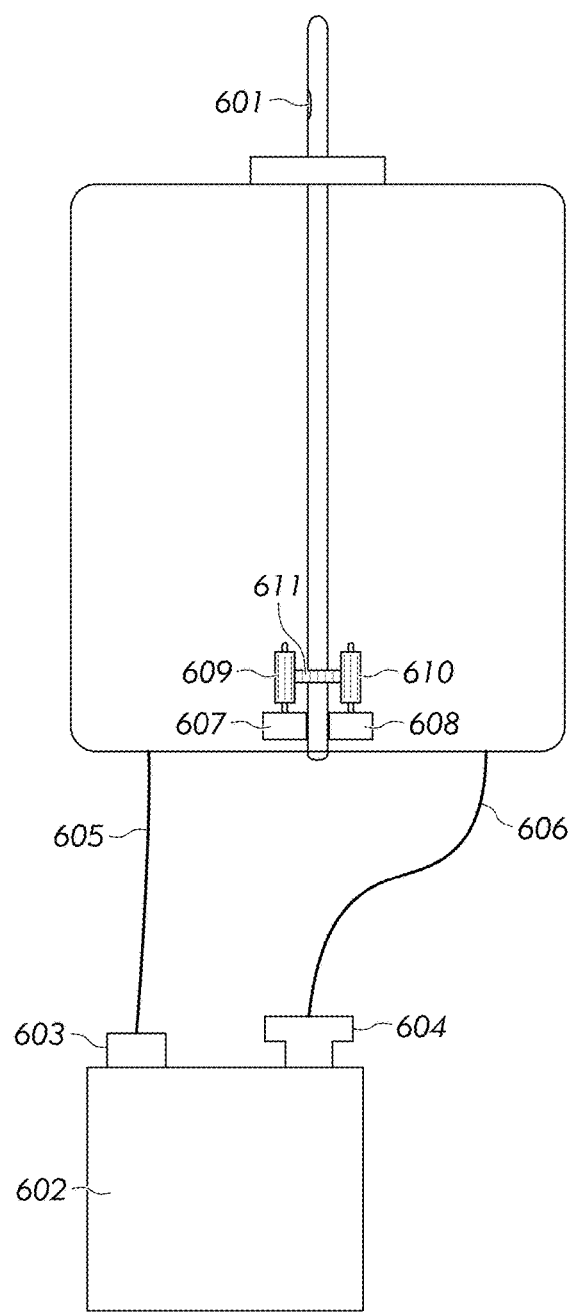
FIG. 6 illustrates a partial cross-sectional side view for another non-limiting embodiment of a motor of the present disclosure described herein.

Referring to FIG. 6, one embodiment for a method of operation will now be disclosed. Here, the battery 602 can power the motor. Further, the motor's spinning shaft 601 can rotate spinning gear 611. The main motor spinning gear will cause the generator spinning gears 609 and 610 to rotate. This in turn will cause power to be produced in the generators 607 and 608, wherein the power is delivered via its positive and negative contacts that will redistribute the energy back into the main motor, battery, and/or other components or areas to allow for energy saving, power regeneration, auto recharging, or other power management/efficiency operations. The motor and booster can be one combined unit, two separate units, or more than two units, wherein the combined motor unit and booster are shown in FIG. 6 and two separate units shown in FIG. 5. The booster pack can also have more than two generators or just one. Also, the main motor can still include all the other necessary components, mechanical systems, electro-mechanical systems, and electronic systems needed that allows it to function.

Still referring to FIGS. 5A-5D and FIG. 6, the boosters and generators can include one or more internal or external generators/motors or any other technology that may become available. This invention/concept/system will not be limited to a certain size, material or shape or other attributes. Further, it is contemplated within the scope of the disclosure that any the aforementioned components 501-611 may also be replaced with other components. Further, the booster's internal parts can also be larger or smaller if necessary in variant models. Also, coupling and decoupling methods of this system can include but not limited to press and lock buttons, screwing and locking, latches, magnets, and or any other methods or technology that may become available that will allow for coupling and decoupling. Further, for the embodiment wherein the motor and booster/generator are combined in an all-in-one unit, the motor can have one or a plurality of energy saving or regenerating elements and/or systems. In addition, for the embodiment wherein the motor and booster/generator systems are separate or independent components connected to each other, the generating or regeneration system can have a single or a plurality of energy saving or regenerating elements and/or systems. For example, a booster or energy regeneration system can have one or more generators or energy recycling or capturing and distributing technologies. It is contemplated within the scope of the disclosure described herein that the system can make use of any technology that can create, recreate, cycle, recycle, generate, regenerate energy or power, either in a closed loop or open loop system.

Still referring to FIGS. 5A-5D and FIG. 6, the part of the system that will generate or regenerate energy back into the motor or routed back to battery can include generators, or motors, or any other type energy generating, recycling or capturing technologies or similar systems. Here, this will allow for the main motor or engine system to recycle or capture energy created from the rotating shaft and or other components. Further, the energy booster or generator is not be limited to being positioned atop or below main motor, which may require the shaft that connects with the regenerator/booster motor to be inverted. Further, in another embodiment, the booster or power regenerating system can reroute the energy or power back to the rechargeable battery, which will result in extended battery run time and/or improved efficiency. In addition, the shaft of the motor can extend from the top, or can extend from the top and bottom allowing for multiple propellers on top and/or bottom of motor while the main motor/system is positioned in between. Also, another variant model may have an extended shaft going past normal length through the top/bottom of motor/system and made long enough for multiple propellers. In addition, the motor shaft can also have interlocking features, wherein the interlocking can connect to create a straight line or crate an angle with a joint feature.

Figure 7:
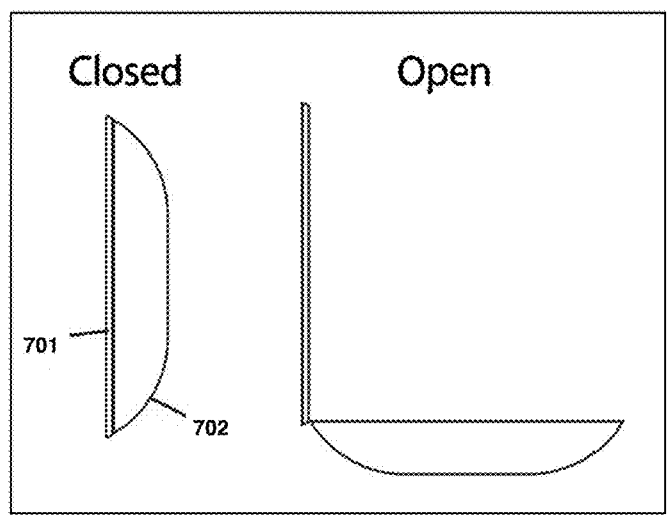
FIG. 7 illustrates two side views for one non-limiting embodiment of a wall mountable base station of the present disclosure described herein.

Referring now to FIG. 7, one embodiment for a base station is shown that can be wall mountable. Here, the base station can include a mountable attachment portion 701 for mounting to a wall. In addition, a housing portion 702 can be pivot, be hinged, and be opened with respect to mounting portion 701. Housing portion 702 can include a pull-out cartridge tray system and some or all of the components previously disclosed with respect to FIGS. 3A-3C. Further, with respect to the embodiment of FIG. 7, the UAV will be level with cartridges and installation apparatus. In addition, the base station may also have motion sensor, lights, and cameras, among other features. Further, mounted portion 701 can have an articulating member such as a hinge. The base station can also have battery docking or swapping capabilities. Further, the base station may also include solar re-charging technology, such as multiple photovoltaic modules. Further, the base station can have standard features such as wireless, SD card slot, and power jack, or a combination thereof. Further, certain configuration of the base station may have wall jack mounts.

Figure 8A:
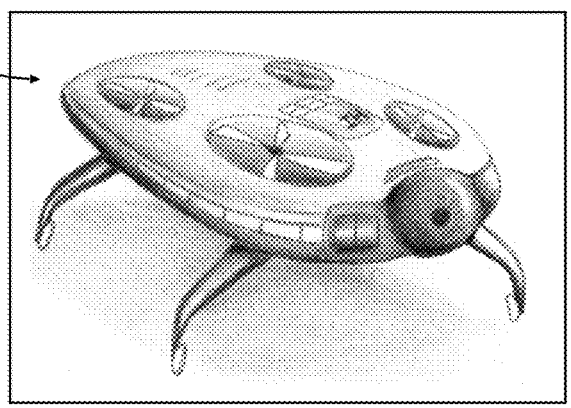
FIG. 8A illustrates a perspective view for one non-limiting embodiment of an unmanned aerial vehicle (UAV) of the present disclosure described herein.
Figure 8B:
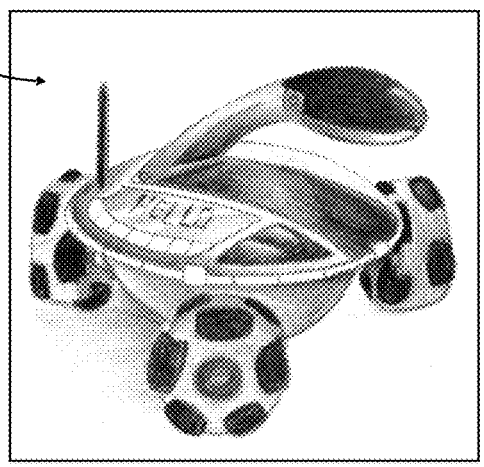
FIG. 8B illustrates a perspective view for one non-limiting embodiment of an unmanned ground vehicle or ground defense unit (GDU) of the present disclosure described herein.
Figure 8C:
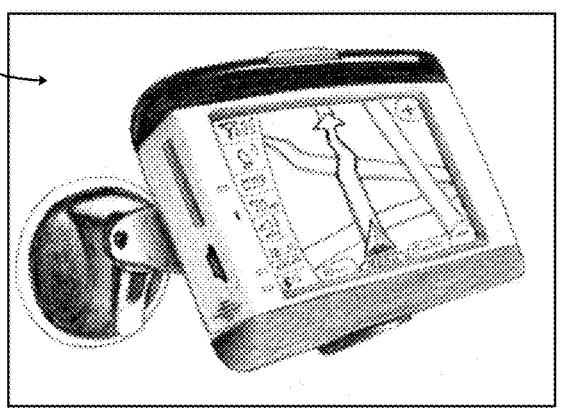
FIG. 8C illustrates a perspective view for one non-limiting embodiment of a vehicle device unit (VDU) of the present disclosure described herein.

Referring now to FIG. 8A-8C, several embodiments for a UAV 800A, GDU 800B, and VDU 800C are shown. Here, any of UAV 800A, GDU 800B, and VDU 800C may be remote controlled by an operator, pre-programmed, or automated to fly, travel, or operate according to pre-defined instructions or software. Here, any of units 800A, 800B, or 800C may have any shape, configuration, size, or dimension.

Also, additional features that the UAV may also have include but are not limited to the following:

Power—On/Off capability.

LCD/Touch Screen—For user input capability.

Camera—for capturing footage

Rechargeable Battery Pack

Sensors—For motion detection, crash prevention/distance sensors.

Bluetooth/Wi-Fi/Cellular/Other—To connect to networks and wireless devices for updates and other tasks.

Head Lights—To illuminate dark areas.

Emergency button—To notify designated emergency contact, police, fire department, and medical personnel.

Cartridge slots—To accept genuine cartridges. May detect if cartridge(s) have been tampered with, hacked, damaged, or are un-authorized for use. Cartridge slots may be on the top, bottom, sides, front or rear of unit, and any areas in between.

Menu buttons—To allow user to change and view settings, i.e. area scanner, guard mode, stealth mode, power save, etc.

Internal Solid State Memory or Drive—To store data for fast read/write.

Waterproof or water resistant capabilities and features.

Memory card slot—For storing more data.

Charger port and charger contacts—for charging from docking station or computer or wall outlet.

SIM card slot—To connect to cellular network to call, transfer video/audio, check e-mail and more.

Landing/take-off Legs or feet, in addition to flotation for on water landing/take-off.

Landing/take-off wheels on legs.

Parachute—for emergency landing or catastrophic malfunction.

Alert Lights—Small lights that flash when there is an alert.

Propellers or propulsion mechanism—To allow UAV to fly.

Speakers—To audibly output messages, alerts, sirens, and more. Also system can be set up to speak to a user.

Software—Built-in software will have data and recommended solutions for most situations however you can adjust presets and teach your UAV on how you want the situation handled. It learns what to do and how to do and what not to do. It also follows instructions and execute orders given to it. Updates itself when needed and apply add-on apps for extra features or capabilities.

Microphone—Enables user to give commands and to speak to emergency personnel or anyone on the other end.

Internal balancing system—A sophisticated system that detects when UAV is off balance and resolves the issue.

Energy Generators—Will be small energy generating propeller elements that provides more energy to the unit, allowing it's battery life and flight time to be extended.

Multi Generator Motor—A motor with generators built into it.

Water/Air Unit—A unit that goes underwater as well as fly.

Water/Ground Unit—A ground unit that has the ability to go under water and complete tasks.

Advanced Propellers—Will be swiveling propellers that will allow the unit to not only fly faster but do aerial acrobatics or perform strategic maneuvers.

Bladeless UAV body—Has no propellers and allow user to add whatever type of propeller they desired.

Wings—Will allow unit to fly with greater speed and higher altitudes.

Ground Unit—A ground unit that has the ability to do complete multiple tasks around your home, office or outdoors.

Solar elements—To generate energy for the unit.

Mounted GPS Unit for car—A GPS that user can easily upgrade or modify.

Wheeled Landing Legs—allows the unit to drive on surfaces.

Rearview Mirror—an advanced customizable mirror that allow user to upgrade camera and other features.

Pest Repellant—A natural pest repellant (dry, liquid, strips, or other form).

In addition, additional features that the cartridges can have include but are not limited to the following:

Advanced Camera—High tech camera system that's much larger than a standard camera and have additional features such as laser, night vision, or photography camera, etc.

Metal detector 1—Scans the ground and marks the areas where things are detected. If you choose not to mark the area physically, you can view detected item and their areas with paired special eyewear, phone, computer, or other device.

Spotlight—Used to illuminate dark areas.

Metal detector 2—Scans person entering your home or accessing your property for weapons.

Advanced Speaker—A unique speaker system that allows user to listen to music from the memory card, solid state storage or through wirelessly connecting to approved devices or cell network. It can also be used to deter pests by pestering them with loud music or eerie sounds, forcing them to relocate.

Parachute—In the event of an accident a parachute will be activated to prevent serious damage or injury Memory card slot—For storing more data.

Lake, pond, river, or ocean water sampler—To test water quality.

Vacuum—For cleaning up small messes and pest infestations.

Lake, pond, river, or ocean scanner for fish—For hovering over water and locating fish.

Smoke & Carbon Monoxide Detector—To alert a user and fire fighters when necessary and attempt to put out fires with a miniature fire extinguisher.

Fish Net/Trap—UAV hovers over water and watches for small fish and release net or trapping system Laser Target System—To track and lock on an intruder for improved accuracy.

Paint/Ink Head—Similar to a print head in a printer but can be used any where at anytime.

Advanced Defense Pack—To subdue attacker, man or beast. Will also include mace, pepper spray, or taser.

Drill attachment—To allow device to do minor repairs around the house or office.

Ultrasonic Pest Repellant—To emit a certain frequency of sound to rid pest.

Stud detector—assist with construction and have pencil, sticker, or other labeling method to mark the spot Sticky Tongue—Similar to that of a frog's or chameleon's tongue for catching pest like ants, wasps and other small creatures. The apparatus will propel out at lightning speed towards the pest, stick to it's body, and shock it if necessary. The pest is released from tongue into the containment area of the cartridge. The tongue resets itself for another round if there are more pest to subdue.

Window Cleaner—Includes cleaning spray, non abrasive scrubber, and squeegee.

Projector—To allow to see what is seen by the user's other devices and home security cameras. Can also view saved file or browse web.

Air freshener—Can go throughout a home or office to spray natural air freshener or deodorizer.

Flexible Hand/Claw—For picking up small things around house, office or outdoors.

Dispenser—Can be used to give dog treats or plant seeds, water plants, etc.

Radar—For scanning areas for threats.

Bubbler—Sprays bubbles for kid fun.

Printer—Attachment for printing useful information, i.e. system reports and more.

Printer/Cam—Attachment for quick printing of small sized pictures.

Magnets—That allows user to connect magnetic components, attachments, or accessories.

Air Quality Sensor—Attachment for analyzing air quality.

Mold Sensor—Attachment for analyzing mold levels in the air.

Air Cleaner—Attachment for cleaning the air.

Air Blower—Attachment that blows out air.

Radiation detector—attachment for analyzing radiation levels in an area.

Bug Detector—Attachment for scanning a room or car for spy devices.

Radar—Attachment for scanning your home, yard or office. Can detect the number of people or animals in your scanning area and alert you when necessary Airbag/Floater—To reduce crash damage and to allow to float on water.

Shock Net—A net that is release onto pest, i.e. it would zap and trap a snake

Tree Grippers—Attaches to unit and allows for climbing tree and or griping branches. May be used for optional landing gear.

Sky Writer—Uses a natural formula that is released in the sky creating words or art.

Water vacuum and reservoir—A system that will attach to the dispensary UAV and will suck up water and store it in its reservoir and may release when necessary.

Water treater/filter—A system that will attach to the dispensary UAV and will comprise of water suction or water capturing system, filter/treater and a reservoir. Will filter/treat water before entering water tank and or while exiting.

In addition, additional accessories or attachments that the cartridges or UAV can have include but are not limited to the following:

Tree Accessory for Home Base—Allow user to hang the home base in a tree. Similar to a birdhouse but for the UAV.

Ground/Floor Stand—Provides a place for UAV to rest and or charge. User can attach landing and charging platforms, and home base units on this stand. And maybe have a version where multiple bases or platforms can be installed or attached.

Ground Pole—Similar to a flagpole but smaller and for attaching landing and charging platforms, and advanced home base units. May need a post driver for installation.

Wall outlet charge platform—The back of charger platform will connect directly to wall outlet and has no wires.

Wall outlet charger—a regular wall charger with cord, similar to the iPhone charger.

Retractable Landing Gear

Crash Guards—to help guard and protect main components from crash

Basic Door—Similar to a cat door but for ground/water and air units. which allows the unit to go in and out of home or room. It can be installed on a door or in a wall, and can have a two-way door that can be locked manually or automatically.

Auto Door—Similar to the basic door but automatically open, close and lock.

Wall Mountable Home Base—A home base that opens and closes automatically. Designed to be vertically or horizontally installed on the wall or other flat surfaces. Wall mounting is not required. Base can just be placed on a tabletop, desk or countertop.

Simple Charge Base—inexpensive charging platform for unit. Good for indoors or outdoors and uses battery, and or solar. Will NOT have cartridge changing capabilities.

Stair lift/stair track/wall track—For ground/air units, allows the unit to travel up and down stairway or other inaccessible area or terrain.

Advanced Eyewear—Eyewear that includes virtual keyboard and gesture controls and other advanced features.

Sleep Detector—A sensor that detects when things should be turned off by checking to see if you are asleep and if so it will turn off TV and other things around the house.

Multi unit home base—A home base that houses and charges multiple unmanned vehicles.

Multi unit advanced home base—An advanced home base that houses charges multiple unmanned vehicles and has cartridge changing capabilities.

Water Dumper—A bucket type container (with string, rope, or other fastening means) that attaches to UAV. It can scoop up water and dumps it when and where its needed.

Charging center—A larger housing base for multiple units to get a quick charge if necessary. May be charged through the landing gear making contact with the charging mat in the housing.

Spinning top and spinner—An attachment for spinning, releasing, and retrieving a spinning top and spinner.

The UAV may also include but is not limited to the following additional features:

UAVs with special landing gear can charge itself from power lines, power mats and maybe home bases Home Base—May require an apparatus inside home base to hold the UAV or other units still and sturdy during installations.

Pre/Post Crash Helper UAVs—Detects when a Brother Drone (drones that are paired together by owner) or Buddy Drone (could be a guest or neighbor's drone) is malfunctioning or about to crash or has crashed and attempts to assist. This will have to be approved by users prior to incident or can be requested and approved after incident.

Multi Unit Sync—Allows for all owner's devices to communicate and update each other, take on tasks, share duties and divide mission into separate tasks.

Motor and motor booster—Can include one or more energy generating or regenerating technologies.

Task units—Will be ground, air, or water units designed for only 1 or a few purposes as oppose to one that can install any type of cartridge for many tasks. For example, if someone just wanted to get a fire extinguishing unit, then the unit will only need to be capable of extinguishing fires, and refilling or swapping out its cartridge, charging, or changing batteries.

Any multipurpose cartridge or accessory that may be considered as a weapon, can also have a non weaponized version of itself. For example, If the Sticky Tongue cartridge installation causes the drone or other units to be classified as "weaponized" then the one shocking or stun feature can be omitted in a variant model of the cartridge.

A circular disc shaped drone head that rotates to a needed cartridge. Can replace standard unit head or can come as one unit with a variant model.

An optional auto formula/chemicals/liquid refill system for cartridges that can be refilled in the home base.

Waterproof home base for outdoor use.

Camouflage material for select items.

Portable laser pen for a key chain or a mobile device—This will have a "Report for Duty" button (or similar UAV activation/on-alert feature) that orders the unit (UAV, ground unit, and other units) to come to a person or report to a user. It will also have a laser button that can then direct units to a certain area. It can also have authentication features to ensure operation is by the owner or approved by the owner. It can also be paired with the UAV or mobile phone through wireless and may or may not have mini fingerprint reader. An owner can also activate the laser to direct the UAV to a point or area with out pressing the "Report for Duty" button first.

Some exemplary uses for the UAV and base station of the disclosure described herein can include but is not limited to the following:

While children are playing at school the UAV stands guard. A suspicious man may lurk by the school, so the UAV approaches man, camera zooms in and captures a picture of his face and runs it through a sex offender Database and other criminal databases and detects that he is in violation. At this point the UAV will warn the intruder and notify appropriate contacts. Also the incident is being monitored in real-time by professionals or a designated party.

A person is inside a dwelling, and a UAV outside detects an intruder. The UAV can alert a household dog by emitting ultrasonic sounds that will guide the dog to where the burglar is located. When the dog begins to bark, this ensures all burglary deterrents are active.

While a person is eating at a hotel someone tries to get in their room to steal valuables. The UAV can scare a burglar or intruder away after getting a camera snapshot and video of the incident. Further, designated contacts are also notified.

While a family is out camping, an uninvited animal approaches a camping area, wherein the UAV detects it and notifies the user. In addition, the UAV can distract and defend the family.

A mother takes her child and other kids to the park. A UAV can be provided by one of the parents or service company and will allow all parents to check on their children from anywhere in the world. If a bad situation occurs the perpetrator is recorded and deterred.

If there is smoke or a fire detected the UAV will install a mini fire extinguisher in its cartridge slot and commence to suppress the smoke/fire source.

If there is a wasp building a nest near your front door just deploy the UAV by either voice or pointing the laser/beam at the wasp or nest and the base station will install the proper attachment or cartridge in order to remove or deter wasp. The whole operation can be controlled and activated with a computing device, mobile phone, gaming controller, or other compatible devices, which will allow a person to stay protected inside the house or at work.

Before or during a camping trip, the UAV can scan the ground for any threats. If, the UAV detects poisonous plants, tics, mites, snakes, etc. then it can advise a person to relocate.

The UAV can be placed at a school to verify who is picking up the children by using its face recognition feature. If the person doesn't match what's in the school's database the person will be stopped.

If a user forgets to turn the lights out and clean the crumbs off counter at home before rushing out, the UAV automatically turn lights out and also vacuum and wipe/clean the counter.

The unmanned vehicle can also include optional radar/proximity sensors that can be put around a monitored area and it will connect to the UAV to give accurate position of perpetrator.

If there are multiple UAVs, unmanned vehicles, or defense units on one network, they will sync to each other. For example, if one UAV has targeted one intruder then the other UAV knows that it would have to target the other intruder.

Special Eyewear can allow a person to connect to the UAV and see what it sees and you can direct it with your hands, such as augmented reality vision devices.

If one UAV is down one or more in the area will try and find and save or recover it.

While specific embodiments have been shown and discussed, various modifications may of course be made, and the disclosure described herein is not limited to the specific forms or arrangement of parts described herein, except insofar as such limitations are included in the following claims. Further, it will be understood that certain features and sub-combinations are of utility and may be employed without reference to other features and sub-combinations.

What is claimed is:

1. An unmanned vehicle and base station, comprising:
   an unmanned vehicle configured to be controlled remotely;
   a first compartment within the unmanned vehicle for carrying payload, wherein the payload is comprised of one or more cartridges;
   a base station having a top rotating tray, wherein the top rotating is disposed above a bottom rotating tray, and wherein the top rotating tray is configured to support the unmanned vehicle thereon;
   wherein the bottom rotating tray stores the cartridges and is configured to align with a securement member; and
   the securement member coupled to a vertical shaft secured to the base station and adjacent to the top rotating tray and bottom rotating tray, wherein the securement member is configured to raise or lower relative to the shaft to retrieve the cartridges from either the bottom rotating tray of the base station or the first compartment of the unmanned vehicle.

2. The unmanned vehicle and base station of claim 1, further comprising wherein the securement member is comprised of graspers or jaws.

3. The unmanned vehicle and base station of claim 1, further comprising a motorized member coupled to the securement member and vertical shaft.

4. The unmanned vehicle and base station of claim 1, wherein the top and bottom rotating tray are configured to rotate in a circular orientation.

5. The unmanned vehicle and base station of claim 1, wherein the motorized member lowers or raises the securement member along the vertical shaft.

6. The unmanned vehicle and base station of claim 1, wherein the lower tray comprises a plurality of second compartments, wherein each of the second compartments is configured to house the cartridges.

7. The unmanned vehicle and base station of claim 1, wherein the base station further comprises a battery drop chute configured to receive used batteries from the unmanned vehicle.

8. The unmanned vehicle and base station of claim 1, wherein the cartridges can be comprised of: cameras, batteries, supplies, sensors, chemicals, or lighting.

9. The unmanned vehicle and base station of claim 1, wherein the base station further comprises a charging dock.

10. The unmanned vehicle and base station of claim 1, wherein the unmanned vehicle further comprises a power regeneration component.

11. The unmanned vehicle and base station of claim 10, wherein the power regeneration component is comprised of a first motor and a second generator motor independent of each other.

12. The unmanned vehicle and base station of claim 11, wherein the first motor is configured to receive power from a battery, and the second generator motor is configured to receive rotational power from the first motor via a mechanical engagement.

13. The unmanned vehicle and base station of claim 12, wherein the first motor comprises a first shaft and the second generator motor comprises a second shaft, and wherein the first shaft engages the second shaft.

14. The unmanned vehicle and base station of claim 13, wherein the second shaft comprises a plurality of gears for capturing the rotational mechanical energy and converting it to electrical energy.

15. The unmanned vehicle and base station of claim 14, wherein the electrical energy is directed back to the battery, an auxiliary battery, the first motor, or other electrical components of the unmanned vehicle.

16. An unmanned vehicle and base station, comprising:
    an unmanned vehicle configured to be controlled remotely or at least partially autonomously;
    a first compartment within the unmanned vehicle;
    a base station comprising a top tray and a lower rotatable tray, wherein the lower rotating tray stores one or more modular cartridges; and
    a retrieving and loading mechanism coupled to a vertical shaft such that the retrieving and loading mechanism moves along the vertical shaft, and wherein the retrieving and loading mechanism is configured to retrieve the cartridges from the lower rotatable tray of the base station and load them into the first compartment of the unmanned vehicle.

17. The unmanned vehicle and base station of claim 16, wherein the top tray is rotatable and supports the unmanned vehicle thereon.

18. The unmanned vehicle and base station of claim 16, wherein the nodular cartridges can be comprised of: cameras, batteries, supplies, sensors, chemicals, or lighting.

19. The unmanned vehicle and base station of claim 16, wherein the unmanned vehicle further comprises an electric motor and a regenerative motor, wherein the electric motor and regenerative motor are independent of each other such that a first shaft of the electric motor is configured to couple to or decouple from a second shaft of the regenerative motor.

* * * * *